UNITED STATES PATENT OFFICE.

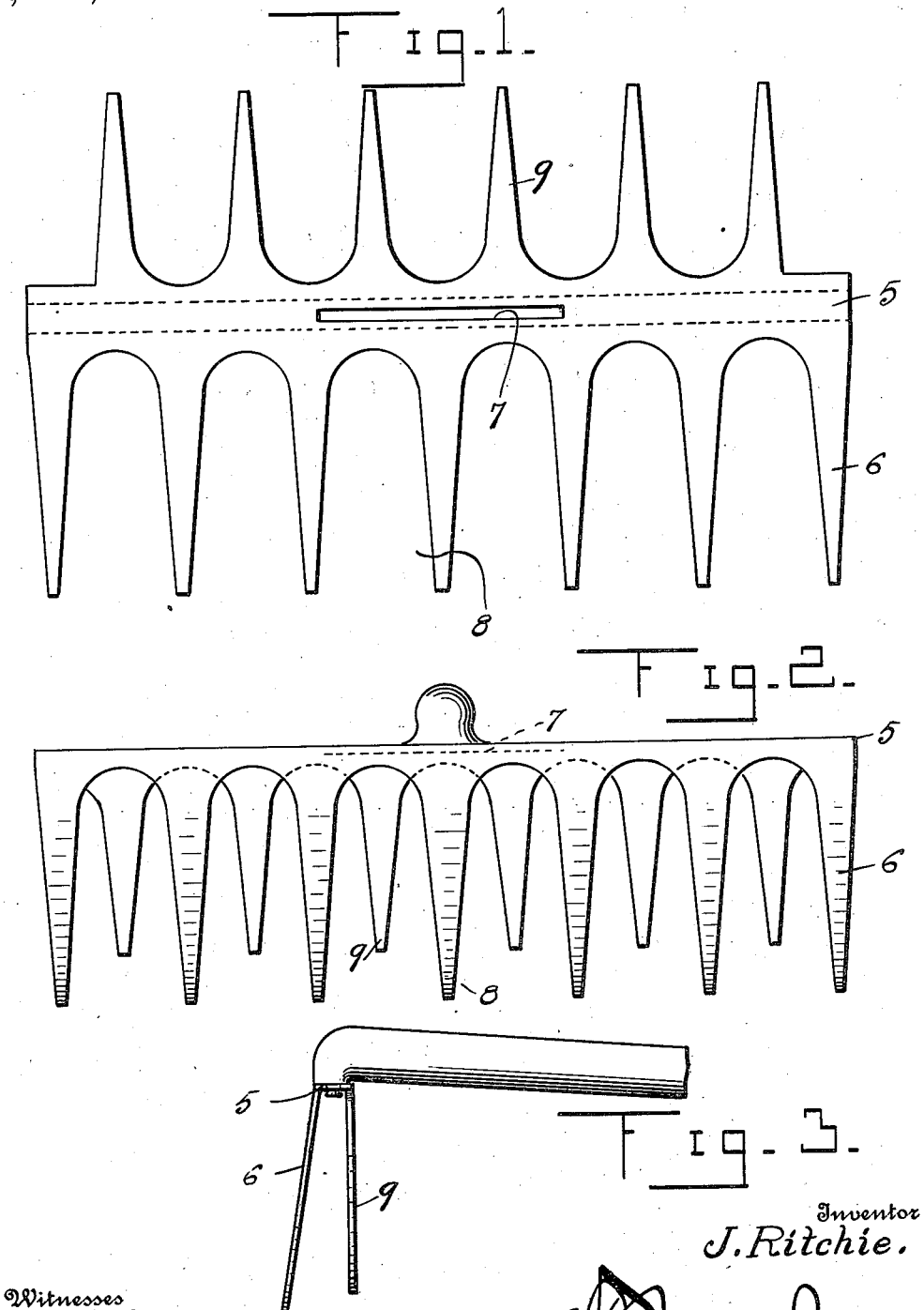

JAMES RITCHIE, OF NEW YORK, N. Y.

RAKE.

1,191,911.                    Specification of Letters Patent.    Patented July 18, 1916.

Application filed July 19, 1913.  Serial No. 779,999.

*To all whom it may concern:*

Be it known that I, JAMES RITCHIE, a citizen of the United States, residing at New York city, in the county of New York and State of New York, have invented certain new and useful Improvements in Rakes; and I do hereby declare the following to be a full, clear, and exact description of the invention, such as will enable others skilled in the art to which it appertains to make and use the same.

This invention relates to new and useful improvements in rakes and has for its object the provision of a rake which will not become clogged during the process of raking.

Another object of my invention is the provision of a rake head which may be cheaply manufactured from a single sheet of material, thereby reducing the cost of production and making a strong and durable rake head.

Still another object of my invention is the provision of a rake head wherein the teeth will be substantially resilient, thereby materially assisting in the prevention of clogging.

With the above and other objects in view I now proceed to describe my invention in the following specification and accompanying drawings, in which, Figure 1 is a view of the blank from which my improved rake head is formed. Fig. 2 is a front view of the rake head showing the same in its operative condition, and Fig. 3 is an end view of Fig. 2.

Referring to the drawings by characters of reference, 5 indicates the body portion of my improved rake head, which is formed of a single sheet of material, and has extending angularly from one edge thereof the teeth 6, which taper toward their ends to form the blunt points of the rake teeth. A set of teeth 9 extend angularly from the body portion on the side opposite the teeth 6 and are formed integrally with said body portion. The angularly extending teeth 9 are preferably shorter than the teeth 6, which extend from the opposite side of the rake and are spaced from each other as shown at 8. An elongated slot 7 is centrally located with relation to the body portion 5 and is adapted to form a means to secure the handle to the rake head. The teeth referred to, as at 6, are preferably spaced from each other and lie in a plane directly opposite the recesses 8, and the teeth projecting from the opposite side of the rake lie directly opposite the recesses formed between the teeth 6, as will be clearly seen upon referring to Fig. 2. The side edges of the teeth 6 and 9 diverge as they extend toward the bases of the teeth and are arcuate, merging into the side edges of the plate for reinforcing the connection between the plate and the teeth as is clearly shown in the drawings.

It will be obvious from the foregoing that with my improved construction the cost of producing such implements as above described, is materially decreased and owing to the peculiar arrangement of the two sets of teeth with relation to each other the clogging of the spaces between the teeth is substantially eliminated. A further noticeable feature of my construction is the resiliency which will be obtained upon the use of rake heads formed in this manner as each individual tooth will be at liberty to spring in either direction independently of the others and in that manner any stones or other material which is apt to be forced and held between the rake teeth will spring the teeth and drop outwardly, thereby leaving the teeth in their normal condition and eliminating the necessity of the operator having to remove the foreign substances from the rake by hand.

While in the foregoing I have shown and described the preferred embodiment of my invention, I wish it to be understood that I may change the specific arrangement of parts without in any way departing from the spirit and scope of my invention.

What I claim is:—

In a rake head, a body plate, a plurality of raking teeth extending from the same side of the body plate at opposite edges thereof, the set of teeth upon one edge being shorter than the teeth on the opposite edge, said teeth being disposed at a slight diverging angle to each other, the teeth formed upon one edge of said plate being disposed staggeredly with relation to the teeth formed on the other plate, said teeth having their sides at their bases arcuate and merging into the side edges of said base for reinforcing the connection between said teeth and base, and the body plate being provided with a longitudinally extending slot for facilitating the adjustment of the body plate to a handle.

In testimony whereof I affix my signature in presence of two witnesses.

JAMES RITCHIE.

Witnesses:
WILLIAM J. BRUN,
HARRY E. SMITH.